United States Patent Office 2,917,501
Patented Dec. 15, 1959

2,917,501

POLYMERIZATION OF ETHYLENE WITH A CYCLOPENTADIENYL TITANIUM CATALYST

Arnold Drucker, Stamford, and John H. Daniel, Jr., Old Greenwich, Conn., assignors to American Cyanamid Company, New York, N.Y., a corporation of Maine No Drawing. Application September 2, 1958
Serial No. 758,595

3 Claims. (Cl. 260—94.9)

This invention relates to a novel method for preparing polyethylene wherein a new and improved catalyst system is employed and wherein the product obtained is characterized by advantageous physical properties. More particularly, the invention relates to the polymerization of ethylene with a catalyst mixture which is soluble or colloidally dispersible in the polymerization reaction medium and which comprises monocyclopentadienyl titanium trihalide in combination with an organometallic compound such as an alkyl aluminum.

The process for the polymerization of ethylene under relatively mild conditions of temperature and pressure using a compound of a metal selected from groups IV–B, V–B, VI–B or VIII of the periodic table in combination with an organometallic compound of an alkali metal, alkaline earth metal, zinc, earth metal or rare earth metal, is disclosed by K. Ziegler et al. in Belgian Patents 533,362, 534,799 and 435,888, for example. A preferred catalyst of the Ziegler type is a mixture of titanium tetrachloride and aluminum alkyl. Also, the use of bis(cyclopentadienyl) titanium salts in combination with organo metal compounds of metals of group I to group III of the periodic system as catalyst systems for the polymerization of ethylene has been studied in the past, as disclosed by Natta et al., J.A.C.S. 79, 2975 (1957); Breslow, D.S. and Newburg, N.R., J.A.C.S. 79, 5073 (1957); Chem. and Eng. News July 21, 1958, page 56 and in U.S. Patent 2,827,446.

We have discovered that for the polymerization of ethylene, the use of the mono-ring compounds, i.e. monocyclopentadienyl titanium trihalides, which were unknown at the time the prior work was conducted, provide an excellent product. The product using monocyclopentadienyl titanium trihalide is distinguished by greater crystallinity, higher density and higher heat distortion temperature than those products made by a high pressure, free-radical procedure. The method of the present invention wherein a monocyclopentadienyl titanium trihalide is employed permits the use of ethylene containing significant amounts of oxygen in the system, thereby adding substantially to the practicality of the system.

It is an object of the present invention to provide a novel method of preparing polyethylene wherein monocyclopentadienyl titanium trihalide is employed in combination with an organometallic compound as the catalyst system. Further objects and advantages will become apparent from the more detailed description of the invention which follows.

Polyethylene prepared according to the method of the invention employs a "low pressure" technique polymerization and, as noted above, the product is characterized by greater linearity over that made by high pressure, free-radical polymerization. The product from the latter high pressure system is characterized by significantly more branching of the polymer chain. The advantage of the more linear product obtained according to the invention is manifested by a greater rigidity and higher softening point. Unlike the solid catalyst employed according to the teachings of Ziegler and others where titanium halides such as $TiCl_4$ are used together with an organometallic compound, the active catalyst derived from monocyclopentadienyl titanium trichloride is either soluble or colloidally dispersed in a very finely divided form. Because of this, it is more readily removed from the crude polymerization product than the coarser catalysts of the type described by Ziegler.

A further advantage of the linear type polyethylene of the invention is its marked tendency to crystallize, i.e. in linear type polyethylene, the degree of crystallinity is of a higher order than that obtained in the branched type made by free-radical catalysts.

In the preparation of polyethylene, it is known, for example, that the quantity and nature of the polymers derived from the polymerization reaction are strongly affected by the purity of monomer as well as of the catalyst. The difficulty has been occasioned by the fact that the catalyst is easily attacked by oxygen and moisture. We have found that the monocyclopentadienyl catalyst is effective in the presence of significant amounts of oxygen.

The monocyclopentadienyl titanium trihalide is employed in conjunction with organometallic compounds of metals of group I to group III of the periodic system in initiating polymerization. Generally, aluminum organic compounds are utilized. As such are the trialkylaluminum compounds containing alkyl radicals up to 8 carbon atoms, i.e. methyl, ethyl, propyl, butyl, isopropyl or isobutyl radicals, for example, or mixtures of such radicals. Illustrative specific compounds of this type are such as triethyl aluminum, triisobutyl aluminum, diethyl aluminum monochloride, monoethylaluminum dichloride, and the like.

Other organometallic compounds include lithium, beryllium, magnesium, zinc and cadmium in which the metal is bonded to an alkyl radical, as named above. Specific illustrative examples include butyl lithium, diethyl magnesium and diethyl beryllium.

The amount of transition metal halide may vary from about 0.01 to about 10% by weight and preferably is used in amounts of from 0.05 to 5% by weight on the weight of ethylene.

The weight ratio of the monocyclopentadienyl titanium trihalides, more specifically trichlorides, tribromides and triiodides, to organo metal cocatalyst may vary from about 1:02 to about 1:20, but is preferably maintained within the ratio range of from about 1:1 to 1:10, respectively.

The monocyclopentadienyl titanium trihalides employed in the present invention are believed to be new chemical compounds. A suitable illustrative method for the preparation thereof is described below. However, these compounds as such and their means of preparation apart from the use herein described and claimed form no part of the present invention, their preparation being more fully set forth in the copending U.S. patent application, Serial No. 693,030.

*Example A*

Cyclopentadienyl titanium trichloride is prepared in an inert atmosphere (e.g. nitrogen, argon, helium, etc.) by the reaction of titanium tetrachloride with dicyclopentadienyl magnesium in xylene solution. The orange-colored, solid product partially crystallizes out and can be filtered off. The remainder is obtained by concentrating the xylene solution and allowing the product to crystallize. Good yields of high-purity material are obtained. A more detailed description follows.

Into a three-necked, round-bottomed flask fitted with a gas inlet (through which nitrogen is passed to purge the flask of air during the entire reaction period) a stirrer, and a two-necked adapter holding a dropping funnel and a reflux condenser fitted with a gas outlet, is poured approximately 600 ml. of a xylene solution containing 21.3 g. of dicyclopentadienyl magnesium. To this is added, over a period of 30 minutes, approximately 52 g. of $TiCl_4$ dissolved in about 30 ml. of xylene. An ice-water bath is used to cool the flask during addition. The reaction mass is then maintained at reflux for 3½ hours.

When the apparatus has cooled, it is opened and the xylene solution containing finely divided black, non-crystalline material is decanted off into a filter. The orange-colored crystals of $TiC_5H_5Cl_3$ remaining in the flask are slurried with petroleum ether (B.P. 30°–60° C.) and poured onto a Büchner funnel where they are washed several times with petroleum ether and dried. The clear, red-orange solution is evaporated in a simple distillation apparatus to half its volume and seeded with previously obtained crystals of pure product. On cooling, large orange-colored crystals of additional product form in the mother liquor. The total yield of cyclopentadienyl titanium trichloride based on the dicyclopentadienyl magnesium is 78.2% of the theoretical.

The product is stored in an inert atmosphere. Though it is fairly stable in air, a yellow coating of hydrolysis product will form on the surface of the crystals if they are left exposed to moist air for a short period.

*Example B*

In this example the order of addition of reactants is reversed from that of Example 1. More particularly, it is the same as Example A except that 30 ml. (52 g.) of $TiCl_4$ dissolved in about 100 ml. of xylene is placed in the flask. To this is added, over a period of 40 minutes, 22.2 g. of dicyclopentadienyl magnesium dissolved in about 525 ml. of xylene. The yield of cyclopentadienyl titanium trichloride, based on the dicyclopentadienyl magnesium, is 51% of the theoretical.

The $TiC_5H_5Cl_3$ can be recrystallized from xylene. It forms bright orange crystals, M.P. 140–142° C. The pure product gives a good elemental analysis. Calculated for $TiC_5H_5Cl_3$: C, 27.37; H, 2.30; Cl, 48.48; Ti, 21.83. Found: C, 27.72; H, 2.65; Cl, 48.42; Ti, 21.8 (titanium analysis by visible spectroscopy, chlorine by Volhard method); molecular weight by boiling point in $CHCl_3$, calculated: 219.3; found: 224.

Considerable leeway is possible in conducting the polymerization reaction. The temperature and pressure used may be varied as desired or as conditions may require to give the desired product. Generally, the polymerization reaction is conducted at room temperature or higher, i.e. from 20° C. to about 35° C., although any temperature from about −10° C. to about 100° C. and even higher may be suitably employed. As a practical matter, temperatures of between 20° C. and 50° C. are preferred. Atmospheric pressure or near-atmospheric pressures are preferably utilized, although pressures below atmospheric and up to 50 atmospheres or more may be used. The method of the invention may be conducted batchwise or in a continuous or semi-continuous manner.

As will be apparent from the examples which follow, the monocyclopentadienyl titanium trichloride is preferably admixed with or reacted with the organometallic compound in a suitable inert anhydrous organic liquid or diluent prior to its use in the polymerization reaction. Illustrative examples of such solvents or diluents are butane, n-pentane, n-hexane, benzene, toluene, xylene, naphthalene, and the like. Halogenated hydrocarbons such as o-dichlorobenzene or chloronaphthalene may also be used. The polymerization reaction may be conducted alternatively by first adding ethylene, the monocyclopentadienyl titanium trichloride in an inert solvent and subsequently introducing the organometallic compound, e.g. triethyl aluminum, thereto.

In order that the invention may be more fully illustrated and understood, the following examples are provided. The molecular weight is indicated by measurement of the reduced specific viscosity (RSV), measured under the concentration indicated at 135° C.

*Example 1*

The polymerization of ethylene is carried out, starting with the following amounts of raw materials:

0.22 g. (0.001 mole) cyclopentadienyl titanium trichloride
0.36 g. (0.0031 mole) triethyl aluminum
0.09 g. (0.0025 mole) HCl
150 ml. benzene The orange-colored crystalline cyclopentadienyl titanium trichloride [$(C_5H_5)TiCl_3$] is charged into a suitable reaction flask fitted with a thermometer, gas inlet tube, a rubber serum cap and a gas outlet leading to a mineral oil bubble counter. Attached to a side arm above the reaction vessel by a ball joint is a benzene container containing 150 ml. dry benzene. A Teflon-coated magnetic stirring bar is placed in the flask. The benzene was frozen solid in a Dry Ice-acetone mixture. The apparatus is evacuated to a pressure below 0.075 mm. mercury. The solvent is degassed by allowing it to thaw, freezing it again and evacuating the system. This is repeated two more times and the solvent is finally poured into the reactor by rotating the bottle upward. After five minutes, all the $(C_5H_5)TiCl_3$ dissolved, giving a bright yellow solution. The $Al(C_2H_5)_3$ in a 30% benzene solution is added to the reactor from a hypodermic syringe which pierced the rubber serum cap. The color of the solution changes from yellow to brown and finally to a black coloration after all the $Al(C_2H_5)_3$ is added. The mixture was allowed to stir for 20 minutes. Ethylene, containing 440 parts per million of oxygen, is then passed through the mixture for 10 minutes. Then HCl, as a 0.35 N solution in benzene, is added to the reactor via a hypodermic syringe and the ethylene flow is continued for 5 hours at a rate slightly greater than that at which the ethylene is absorbed. The temperature increased from 27° C. initially to 35° C. at the end. The reaction mixture turns light brown and polymer particles may be seen in suspension. The reactor is opened and 100 ml. of methanol is added. The white polymer which appears is filtered and thoroughly washed, first with a 10% solution of HCl in methanol and then with methanol. The polymer was dried in vacuo at 50° C. for 4 hours. A total of 6.5 g. of polyethylene of M.P. 133° C. and a reduced specific viscosity, RSV ($\eta sp/C$, 0.203 gm./100 ml. tetralin at 135° C.), of 1.172 was obtained.

*Example 2*

Example 1 is repeated except that ethylene containing 12 parts per million of oxygen is used and the quantities of raw materials are doubled. Thus, 0.002 mole of $(C_5H_5)TiCl_3$, 0.0062 mole of aluminum triethyl and 0.005 mole of HCl are used. The original black-brown color of the reaction mixture remained unchanged at the end of the reaction. A total of 1.4 g. of polyethylene of M.P. 134° C. and an RSV of 1.448 (0.203 gm./100 ml. tetralin at 135° C.) is obtained.

*Example 3*

Example 2 is repeated except that no HCl is added to the complex formed from $(C_5H_5)TiCl_3$ and $Al(C_2H_5)_3$ and ethylene containing 440 parts per million of oxygen is used. A total of 0.04 g. of polyethylene is obtained.

*Example 4*

Example 1 is repeated except that ethylene containing 900 p.p.m. oxygen is used. A total of 3.8 g. of polyethylene of M.P. 134° C. and an RSV of 1.290 (0.203 gm./100 ml. tetralin at 135° C.) is obtained.

*Example 5*

Example 1 is repeated except that a mole ratio $Al(C_2H_5)_3:C_5H_5TiCl_3$ of 2.5:1 and the following quantities of starting materials are used:

0.171 g. (0.78 mole) $C_5H_5TiCl_3$
0.223 g. (1.95 mole) $Al(C_2H_5)_3$
0.055 g. (1.55 mole) HCl
150 ml. benzene Ethylene containing 440 parts per million of oxygen is used. A total of 6.6 g. of polyethylene of M.P. 134° C. is obtained.

The invention has been described with particular reference to preferred embodiments thereof and with illustrative examples containing suitable proportions and conditions, but it will be readily apparent that variations may be made in details given without departing from the inventive concept herein set forth.

We claim:

1. The process of preparing polyethylene which comprises subjecting ethylene to polymerization at a temperature of from about −10° C. to about 100° C. and at a pressure of from about atmospheric pressure to about 50 atmospheres in the presence of a co-catalyst system consisting essentially of (A) a monocyclopentadienyl titanium trihalide and (B) an organometallic compound of metals of group I to group III of the periodic system.

2. The process of preparing polyethylene which comprises subjecting ethylene to polymerization at a temperature of from about −10° C. to about 100° C. and at a pressure of from about atmospheric pressure to about 50 atmospheres in the presence of a co-catalyst system consisting essentially of (A) monocyclopentadienyl titanium trichloride and (B) an organometallic compound of metals of group I to group III of the periodic system.

3. The process of preparing polyethylene which comprises subjecting ethylene to polymerization at a temperature of from about −10° C. to about 100° C. and at a pressure of from about atmospheric pressure to about 50 atmospheres in the presence of a co-catalyst system consisting essentially of (A) monocyclopentadienyl titanium trichloride and (B) triethyl aluminum.

References Cited in the file of this patent

UNITED STATES PATENTS

| 2,827,446 | Breslow | Mar. 18, 1958 |
| 2,867,612 | Pieper et al. | Jan. 6, 1959 |

FOREIGN PATENTS

| 793,354 | Great Britain | Apr. 16, 1958 |

Notice of Adverse Decision in Interference

In Interference No. 91,791 involving Patent No. 2,917,501, A. Drucker and J. H. Daniel, Jr., Polymerization of ethylene with a cyclopentadienyl titanium catalyst, final decision adverse to the patentees was rendered July 19, 1963, as to claim 3.

[*Official Gazette September 3, 1963.*]

Disclaimer 2,917,501.—*Arnold Drucker*, Stamford, and *John H. Daniel, Jr.*, Old Greenwich, Conn. POLYMERIZATION OF ETHYLENE WITH A CYCLOPENTADIENYL TITANIUM CATALYST. Patent dated Dec. 15, 1959. Disclaimer filed Aug. 13, 1963, by the inventors, the assignee, *American Cyanamid Company*, assenting.

Hereby enter this disclaimer to claim 3 of said patent.

[*Official Gazette October 29, 1963.*]